3,317,525
PREPARATION OF AMINE BORANES
John A. Snover, Peabody, Mass., assignor to Metal Hydrides Incorporated, Beverly, Mass., a corporation of Massachusetts
No Drawing. Filed May 20, 1964, Ser. No. 368,990
5 Claims. (Cl. 260—247)

This invention relates to a method for the preparation of water stable amine boranes and includes provisions whereby a stable amine broane of high purity is obtained.

Prior to the present invention amine boranes had been prepared by reacting an amine with previously prepared diborane in an ether solvent, followed by removal of the ether solvent. The amine boranes produced by this method often had a purity greater than 95 percent but were unstable, due to the presence of unknown impurities, and when stored in a closed receptacle, pressure build-up and odor was noted along with a decrease in the amount of hydrolyzable hydride.

In the course of my investigations I prepared morpholine borane by first generating diborane by reacting sodium borohydride with boron trifluoride etherate in tetrahydrofuran and then adding morpholine to the reaction mixture to obtain a solution of morpholine borane in tetrahydrofuran and a precipitate of sodium fluoroborate. The precipitate was removed by filtration which was slow and tedious. The tetrahydrofuran was removed from the filtrate by evaporation to obtain solid morpholine borane. The product did not exhibit shelf stability.

During further investigations, I discovered that the above-mentioned slow filtration step could be avoided by mixing about an equal volume of an aqueous solution of an alkali metal hydroxide, such as an aqueous solution containing from about 5 to about 20 percent by weight, preferably about 10 percent by weight, of an alkali metal hydroxide, such as sodium hydroxide or potassium hydroxide, or alkali metal halides, with the above-mentioned solution of morpholine borane containing precipitated sodium fluoroborate. The amount of such aqueous solution used should be not substantially more than the amount necessary to dissolve the by-product. When this mixture was permitted to settle, it split in two layers, the top layer containing tetrahydrofuran and about 10 to 20 percent of water along with the morpholine borane. The bottom aqueous layer contained the caustic and sodium fluoroborate and was drawn off and discarded. The top layer was concentrated with heat and vacuum to remove all the tetrahydrofuran and obtain a slurry of morpholine borane in water. The solid morpholine borane was recovered from the slurry by crystallization by cooling, filtration and washing with water. This product was of high purity and had a high stability such that no loss in hydride value was observed in six months of storage at ambient temperatures. Alternately, the product can be salted out of the slurry with either sodium chloride or sodium hydroxide, washed thoroughly with cold water and dried.

I have further discovered that the method of the invention is applicable generally to the preparation of any amine borane which is stable toward water. Thus, the morpholine may be replaced by other amines and the tetrahydrofuran may be replaced by other ethers which are solvents for the amine borane to be produced. In its broad aspect the invention contemplates the preparation and purification of water-stable amine boranes formed by the reaction of diborane with amines selected from primary, secondary, and tertiary amines including cyclic aliphatic amines, cyclic aromatic amines, and heterocyclic amines. As illustrative examples of such amines I may mention in addition to morpholine, N-methyl morpholine, N-ethyl morpholine, piperidine, isopropylamine, trimethylamine, triethylamine, ethylenediamine, and pryidine. As illustrative of other ethers which are solvents for amine boranes I may mention diethyl ether, dibutyl ether, tetrahydropyrane, diethylene glycol dimethyl ether, ethylene glycol dimethyl ether, triethylene glycol dimethyl ether, and tetraethylene glycol dimethyl ether.

As will be apparent to a person skilled in the art, in the practice of the invention the diborane may be generated by reacting in an ether an alkali metal borohydride, such as sodium, potassium or lithium borohydride, with a boron trihalide etherate, such as boron trichloride etherate, and boron trifluoride etherate, or hydrochloric acid.

The invention provides (1) a convenient method for generating and handling diborane and reacting it with an amine, (2) a convenient method for separating the amine borane from the by-product, such as alkali metal fluoroborate or alkali metal halide, and (3) isolation of the amine borane by crystallization from water to insure high purity and stability. All of this can be accomplished in one reaction vessel. The product then is filtered and washed.

While the invention is generally applicable to the preparation of amine boranes which are stable toward water, it is equally applicable for purifying any such impure amine borane which has been prepared by reacting diborane with an amine. Thus, an ether solution of the impure amine borane may be mixed with about an equal volume of the previously mentioned aqueous solution of an alkali metal hydroxide and the mixture permitted to settle and form two layers. The top layer, which is a solution of the amine borane in a liquor comprising ether and about 10 to 20 percent of water, is separated and the ether removed therefrom by evaporation to form a solution of the amine borane in water. The purified amine borane is recovered from the solution by crystallization.

The invention is illustrated further by the following specific example.

To a suspension of 600 grams of powdered sodium borohydride in 8–10 liters of dry tetrahydrofuran, cooled to about 0° C. with an ice-water bath, was added slowly 2840 grams of boron trifluoride etherate over a period of about 1–2 hours while the solution is maintained at 0° to 5° C. When the addition was completed, the reaction mixture was permitted to stand for an additional hour and then 1750 grams of pure morpholine was added slowly with stirring. Then a 10 percent aqueous solution of sodium hydroxide was added, slowly at first, with rapid stirring. The mixture was permitted to settle to form two layers, the top layer containing tetrahydrofuran and about 10–20 percent of water together with the amine borane. The bottom aqueous layer containing the caustic and sodum fluoroborate was drawn off and discarded.

The top layer was concentrated with heat and vacuum until all the tetrahydrofuran had been removed and there remained only a slurry of morpholine borane in water. This slurry was cooled to 0° C., filtered and washed with ice-cold water and pulled dry on the filter. The product was further dried under vacuum at 60–70° C. to remove the last traces of water. The yield was about 1800 grams, which is 86% of theoretical. Analysis for active hydride by evolution gave 2.99% hydride; theoretical for morpholine borane being 2.995%. Thus, the product was 99.8% pure based on the hydride analysis.

What is claimed is:
1. In a method for the preparation of a water-soluble amine borane wherein an amine is reacted with diborane in an ether solution formed by reacting an alkali metal borohydride with a boron trihalide etherate in an ether which is a solvent for said amine borane to form a liquor comprising an ether solution of the amine borane and a precipitate of an alkali metal haloborate, the improvement which consists in mixing with said liquor about an equal volume of an aqueous solution of an alkali metal hydroxide containing from about 5 to 20 percent by weight of an alkali metal hydroxide, permitting the mixture to settle and form two liquid layers, the top layer of which comprises a solution of the amine borane in a liquor comprising ether and a small amount of water, separating said top layer and removing the ether therefrom by evaporation to form a solution of the amine borane in water, and recovering amine borane from the last mentioned solution.

2. The method as claimed by claim 1 wherein the amine is selected from the group consisting of morpholine, N-methyl morpholine, N-ethyl morpholine, piperidine, isopropylamine, trimethylamine, triethylamine, ethylenediamine, and pyridine.

3. The method as claimed by claim 1 wherein the amine borane is morpholine borane.

4. The method as claimed by claim 3 wherein the ether is tetrahydrofuran.

5. The method as claimed by claim 4 wherein the boron trihalide is boron trifluoride etherate.

References Cited by the Examiner
UNITED STATES PATENTS
3,037,987   6/1962   Lang et al. _____ 260—290

ALEX MAZEL, *Primary Examiner.*

JOSE TOVAR, *Assistant Examiner.*